United States Patent
Kim et al.

(10) Patent No.: US 10,392,053 B2
(45) Date of Patent: Aug. 27, 2019

(54) SIDE LOAD TRANSFER DEVICE FOR A BODY ON FRAME VEHICLE

(71) Applicant: GM GLOBAL TECHNOLOGY OPERATIONS LLC, Detroit, MI (US)

(72) Inventors: Jungryoung Kim, Rochester Hills, MI (US); Huai-yang Chiang, Warren, MI (US); Hari Prasada Reddy Lingala, Macomb, MI (US); Terry A. Swartzell, Ann Arbor, MI (US); Jayavardhan Tallapragada, Royal Oak, MI (US); Warren J. Parsons, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 15/468,706

(22) Filed: Mar. 24, 2017

(65) Prior Publication Data
US 2018/0273100 A1    Sep. 27, 2018

(51) Int. Cl.
*B62D 21/15*    (2006.01)
*B62D 25/20*    (2006.01)
*B62D 21/02*    (2006.01)

(52) U.S. Cl.
CPC ........... *B62D 21/157* (2013.01); *B62D 21/02* (2013.01); *B62D 25/2036* (2013.01)

(58) Field of Classification Search
CPC ........................ B62D 21/157; B62D 25/2036
See application file for complete search history.

(56) References Cited

U.S. PATENT DOCUMENTS

| 3,132,891 | A | * | 5/1964 | Pyuro | B62D 25/025 296/204 |
|---|---|---|---|---|---|
| 4,848,835 | A | * | 7/1989 | DeRees | B62D 21/02 296/204 |
| 5,352,011 | A | * | 10/1994 | Kihara | B62D 23/00 296/203.03 |
| 5,700,049 | A | * | 12/1997 | Shibata | B62D 24/02 296/187.09 |
| 6,053,564 | A | * | 4/2000 | Kamata | B62D 21/09 296/187.09 |
| 6,786,534 | B1 | * | 9/2004 | Peng | B60J 5/042 296/187.08 |
| 6,857,692 | B2 | * | 2/2005 | Cardimen | B62D 25/025 296/193.07 |
| 6,932,405 | B2 | * | 8/2005 | Nakagawa | B62D 21/02 296/187.12 |

(Continued)

FOREIGN PATENT DOCUMENTS

WO    WO-2014103638 A1 *  7/2014  ............ B60K 1/04

*Primary Examiner* — Hilary L Gutman
(74) *Attorney, Agent, or Firm* — Quinn IP Law

(57) ABSTRACT

A vehicle includes a frame system having a frame rail that extends along and is laterally offset from a longitudinal axis. A body is mounted to the frame system, and includes a rocker panel that extends along the longitudinal axis, and is disposed outboard of the first frame rail. A side load transfer device is positioned between the frame rail and the rocker panel. The side load transfer device is attached to one of the frame rail or the body. The side load transfer device is operable to transfer an applied load from the rocker panel to the frame rail. The applied load being applied to the rocker panel in an inboard direction transverse to the longitudinal axis.

20 Claims, 3 Drawing Sheets

(56) References Cited

U.S. PATENT DOCUMENTS

| | | | | |
|---|---|---|---|---|
| 7,147,272 B2* | 12/2006 | Odaka | ................ | B62D 21/157 |
| | | | | 296/187.12 |
| 7,216,924 B2* | 5/2007 | Li | ................ | B62D 25/025 |
| | | | | 296/187.12 |
| 7,731,274 B2* | 6/2010 | Kishima | ................ | B62D 27/04 |
| | | | | 296/203.03 |
| 8,960,776 B2* | 2/2015 | Boettcher | ................ | B62D 33/023 |
| | | | | 296/193.07 |
| 9,505,442 B2* | 11/2016 | Wu | ................ | B62D 21/157 |
| 9,758,192 B2* | 9/2017 | Hamdoon | ................ | B62D 21/157 |
| 9,809,101 B2* | 11/2017 | Ikeda | ................ | B62D 29/001 |
| 2008/0106119 A1* | 5/2008 | Ma | ................ | B62D 21/157 |
| | | | | 296/187.12 |

\* cited by examiner

SIDE LOAD TRANSFER DEVICE FOR A BODY ON FRAME VEHICLE

INTRODUCTION

The disclosure generally relates to a body on frame vehicle.

Body on frame vehicles include a rigid frame system, which supports a powertrain and an independent body structure. The body structure is attached to the frame system, but is otherwise separate from the frame system, i.e., the body structure is not an integral part of the frame system.

The frame system includes a pair of longitudinally extending frame rails, disposed on opposite sides of a central, longitudinal axis. The body structure includes a floor pan, and rocker panels. The rocker panels are located along the lower sides of the vehicle, between front and rear wheel well openings, and below the doors of the vehicle. The rocker panels are generally disposed in parallel, spaced relationship with the frame rails, on an outboard side of the frame rails.

SUMMARY

A vehicle is provided. The vehicle includes a frame system defining a longitudinal axis. The frame system includes a first frame rail that extends along and is laterally offset from the longitudinal axis. A body is mounted to the frame system. The body includes a first rocker panel that extends along the longitudinal axis, and is disposed outboard of the first frame rail. A first side load transfer device is positioned between the first frame rail and the first rocker panel. The first side load transfer device is attached to one of the first frame rail or the body. The first side load transfer device is operable to transfer an applied load from the first rocker panel to the first frame rail. The applied load is applied to the first rocker panel in an inboard direction transverse to the longitudinal axis.

In another aspect of the vehicle, the first side load transfer device is axially positioned along the longitudinal axis at an approximate driver seating location.

In one embodiment of the vehicle, the first side load transfer device is attached to the body. In one aspect of this embodiment, the first side load transfer device is attached to the first rocker panel.

In another aspect of the vehicle, the body includes a floor pan that is generally disposed above the first frame rail and the first rocker panel. The first side load transfer device may be attached to the floor pan of the body.

In another aspect of the vehicle, the first side load transfer device includes at least one deformable structure operable to deform and absorb energy in response to the applied load. In another aspect of the vehicle, the first side load transfer device includes a bottom wall, a first side wall, a second side wall, and an inboard end wall. At least one of the first side wall and the second side wall includes the deformable structure. In one embodiment, the deformable structure includes a bead formed in at least one of the first side wall or the second side wall.

In one embodiment, the first side load transfer device includes an open top disposed opposite the bottom wall, with the open top positioned against the lower surface of the floor pan. In another aspect of this embodiment, the first side load transfer device includes an outboard open end disposed opposite the inboard end wall, with the outboard open end positioned against an inner wall of the first rocker panel.

In one aspect of the vehicle, the end wall of the first side load transfer device is attached to each of the first side wall and the second side wall. In another aspect of the vehicle, the first side wall and the second side wall are contoured to mate with a lower surface of the floor pan.

In one embodiment, the floor pan includes a cross bar that extends transverse to the longitudinal axis. The first side load transfer device is disposed under the cross bar.

In another aspect of the vehicle, the frame system includes a second frame rail extending along the longitudinal axis. The second frame rail is laterally spaced from the first frame rail across the longitudinal axis. The body includes a second rocker panel extending along the longitudinal axis. The second rocker panel is disposed outboard of the second frame rail. A second side load transfer device is positioned between the second frame rail and the second rocker panel. The second side load transfer device is attached to one of the second frame rail or the body. The second side load transfer device is operable to transfer a second applied load from the second rocker panel to the second frame rail. The second applied load is applied to the second rocker panel in an inboard direction transverse to the longitudinal axis.

In another aspect of the vehicle, the inboard end wall of the first side load transfer device is laterally spaced from the first frame rail a first separation distance, and the inboard end wall of the second side load transfer device is laterally spaced from the second frame rail a second separation distance.

Accordingly, the side load transfer device transfers the applied load from the rocker panel to the frame rail, thereby allowing both the rocker panel and the frame rail to absorb and dissipate the energy from the applied load.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any moveable platform, such as but not limited to a car, truck, van, SUV, etc. The vehicle 20 includes a frame system 22, which supports a body 24. Accordingly, the vehicle 20 may be referred to as a body 24 on frame vehicle 20.

Figure 1:
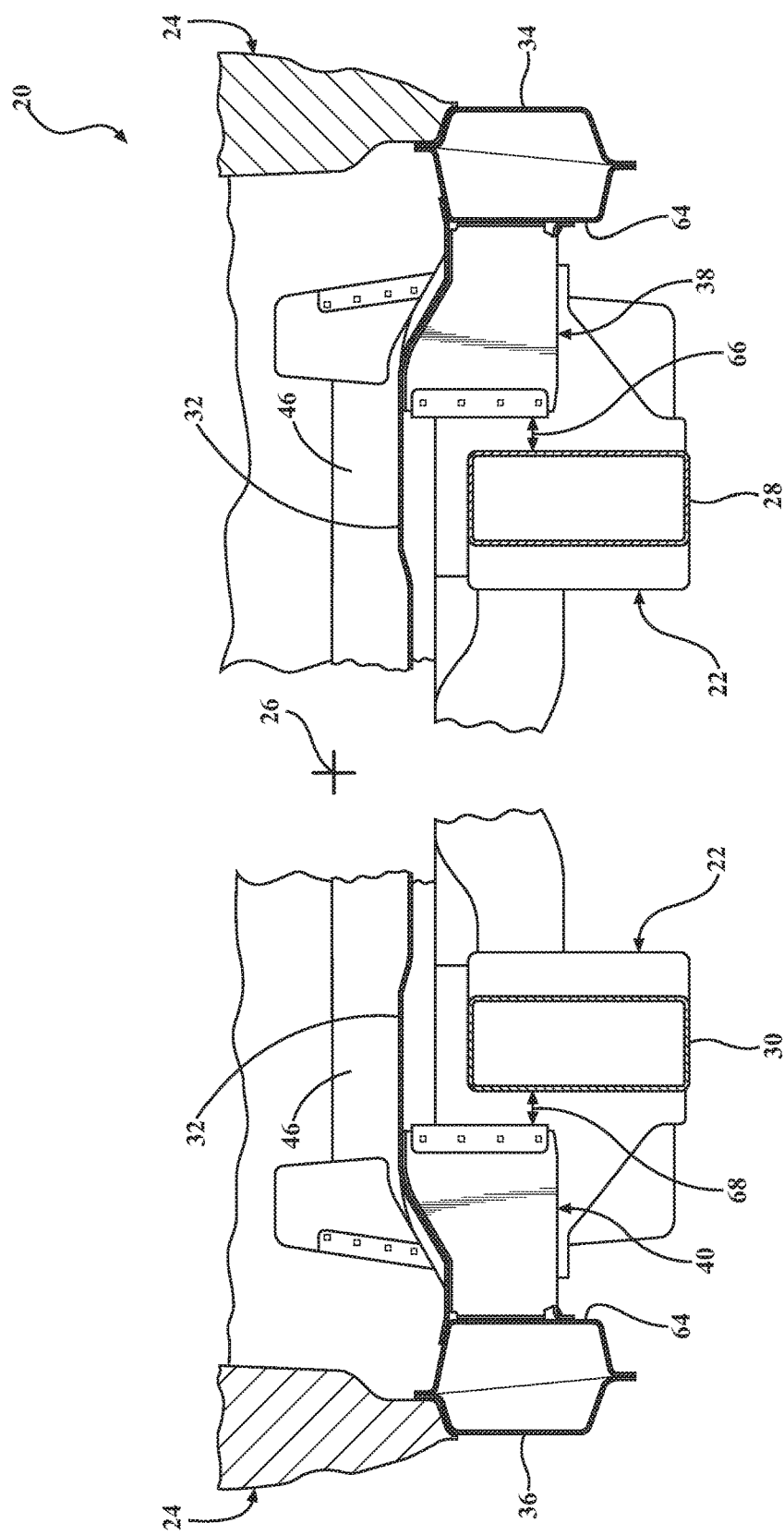
FIG. 1 is a schematic cross sectional view of a vehicle showing a partial body structure on a frame system.

The frame system 22 supports the various components of the vehicle 20, such as but not limited to the drivetrain, wheels, axles, body 24, etc. The frame system 22 includes a forward end and a rearward end. The rearward end is spaced from the forward end along a longitudinal axis 26. The longitudinal axis 26 extends along a longitudinal center line of the vehicle 20, and through a center of gravity of the vehicle 20. Referring to FIG. 1, the frame system 22 includes a first frame rail 28 and a second frame rail 30, laterally spaced from each other across the longitudinal axis 26. Additionally, the frame system 22 may include multiple cross members connecting the first frame rail 28 and the second frame rail 30. The first frame rail 28 is laterally offset from the longitudinal axis 26, on a first side of the vehicle 20. The second frame rail 30 is laterally offset from the longitudinal axis 26, on a second side of the vehicle 20. Accordingly, the first frame rail 28 and the second frame rail 30 are disposed on opposite sides of the longitudinal axis 26.

Referring to FIG. 1, the body 24 is mounted to the frame system 22. The body 24 may be mounted to the frame system 22 in any suitable manner. The specific manner in which the body 24 is mounted to the frame system 22 is not pertinent to the teachings of this disclosure, are well known to those skilled in the art, and is therefore not described in detail herein. The body 24 includes a floor pan 32, a first rocker panel 34, and a second rocker panel 36. The first rocker panel 34 extends along the longitudinal axis 26, and is disposed outboard of the first frame rail 28, on the first side of the vehicle 20. As used herein, the term "outboard" refers to a location of a feature relative to the longitudinal axis 26 of the vehicle 20, which is located farther from the longitudinal axis 26 than is an "inboard" feature. As such, an inboard location is disposed nearer the longitudinal axis 26 relative to an outboard location, whereas an outboard location is disposed farther from the longitudinal axis 26 relative to an inboard feature. The second rocker panel 36 extends along the longitudinal axis 26, and is disposed outboard of the second frame rail 30, on the second side of the vehicle 20. The floor pan 32 is attached to the first rocker panel 34 and the second rocker panel 36, and is generally disposed above the first rocker panel 34, the second rocker panel 36, as well as the first frame rail 28 and the second frame rail 30. As is generally understood in the art, the floor pan 32 forms a floor of a passenger compartment of the vehicle 20.

Referring to FIG. 1, the vehicle 20 further includes a first side load transfer device 38, and a second side load transfer device 40. The first side load transfer device 38 is positioned between the first frame rail 28 and the first rocker panel 34. The second side load transfer device 40 is positioned between the second frame rail 30 and the second rocker panel 36. The first side load transfer device 38 and the second side load transfer device 40 are generally mirror images of each other, disposed on opposite sides of the vehicle 20. The first side load transfer device 38 is described in detail below. While the description does not specifically mention the second side load transfer device 40, it should be appreciated that the description below of the first side load transfer device 38 is applicable to the second side load transfer device 40.

Figure 2:
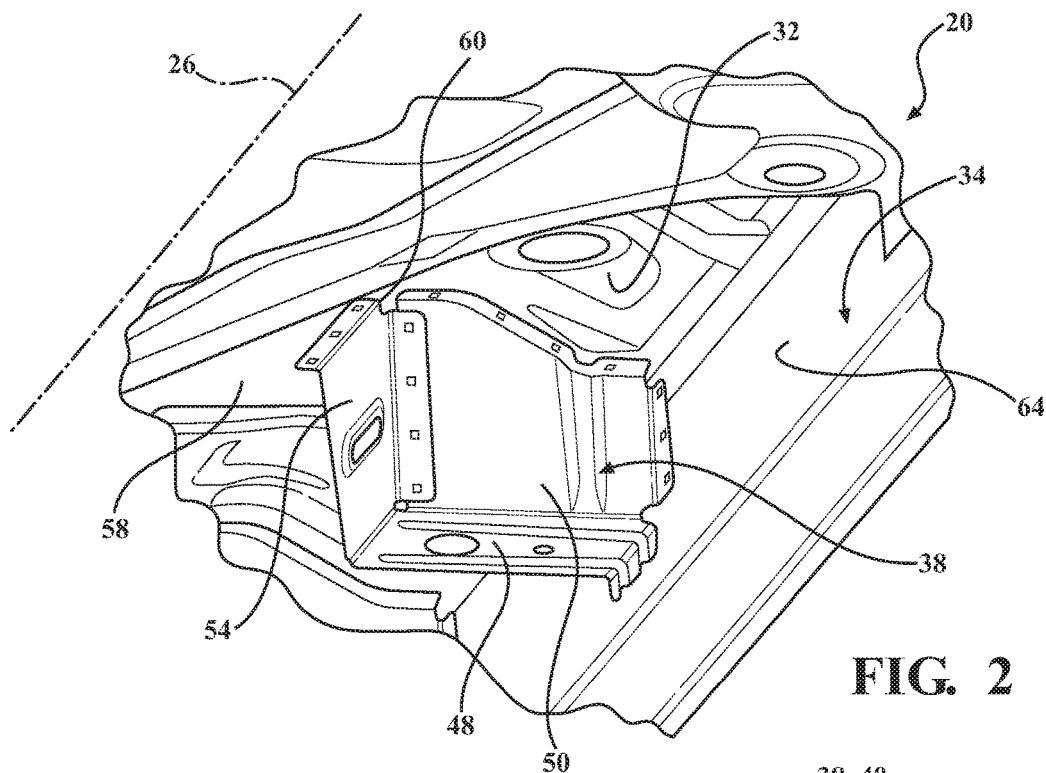
FIG. 2 is a schematic fragmentary perspective view of the body structure.

The first side load transfer device 38 is attached to one of the first frame rail 28 or the body 24. Referring to FIGS. 1 and 2, the exemplary embodiment shown in the Figures and described herein includes the first side load transfer device 38 attached to the body 24. More specifically, the first side load transfer device 38 is attached to both the first rocker panel 34 and the floor pan 32. The first side load transfer device 38 may be attached to the body 24 or the frame rail in any suitable manner, including but not limited to welding, adhesion, mechanical fasteners, etc. While the exemplary embodiment shows the first side load transfer device 38 attached to the body 24, it should be appreciated that in other embodiments, the first side load transfer device 38 may be attached to first frame rail 28 instead.

Figure 4:
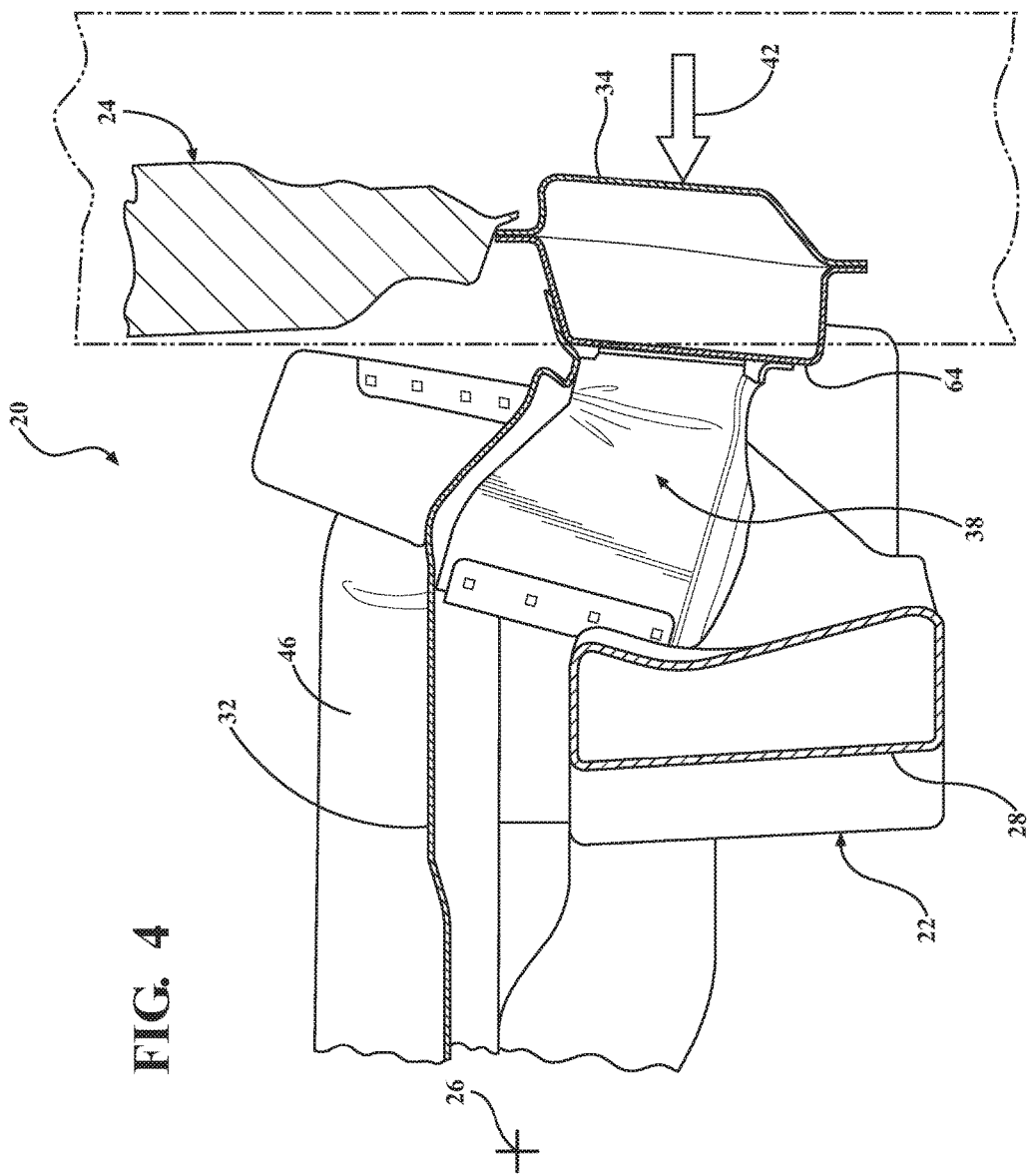
FIG. 4 is a schematic cross sectional view of the vehicle after deformation from an applied lateral load.

Referring to FIG. 4, the first side load transfer device 38 is operable to transfer a first applied load 42 from the first rocker panel 34 to the first frame rail 28. The first applied load 42 is applied to the first rocker panel 34 in an inboard direction transverse to the longitudinal axis 26. Similarly, the second side load transfer device 40 is operable to transfer a second applied load from the second rocker panel 36 to the second frame rail 30. While the second applied load is not shown in FIG. 4, it should be appreciated that the second or left side of the vehicle 20 as shown on the page of FIG. 4 is a mirror image of the first or right side of the vehicle 20 as shown on the page of FIG. 4. Accordingly, the direction of the second applied load and the deformation of the second side load transfer device 40 are mirror images of what is shown in FIG. 4. The second applied load is applied to the second rocker panel 36 in an inboard direction transverse to the longitudinal axis 26. In so doing, the first side load transfer device 38 and the second side load transfer device 40 transfer the first applied load 42 and the second applied load to the first frame rail 28 and the second frame rail 30 respectively. This enables the first frame rail 28 and the second frame rail 30 to contribute to the dissipation and absorption of the energy from the first applied load 42 and the second applied load respectively.

The first side load transfer device 38 may be axially positioned along the longitudinal axis 26 at an approximate front row seating location. In some embodiments, the first side load transfer device 38 is generally positioned along the longitudinal axis 26 to coincide with a center of gravity of a theoretical front row occupant. In other embodiments, referring to FIG. 1, the floor pan 32 may include a cross bar 46 that extends transverse to the longitudinal axis 26, with the first side load transfer device 38 being disposed under the cross bar 46. It should be appreciated that the location of the cross bar 46 may vary from the center of gravity of the theoretical front row occupant, and as such, the location of the first side load transfer device 38 may also vary from the location of the center of gravity of the theoretical front row occupant. The location of the first load transfer device axially along the longitudinal axis 26 may vary, and depends upon the specific design and configuration of the frame structure and the floor pan 32, including such features as the axial location of any cross members of the frame structure, and the axial location of any cross bars 46 in the floor pan 32.

Figure 3:
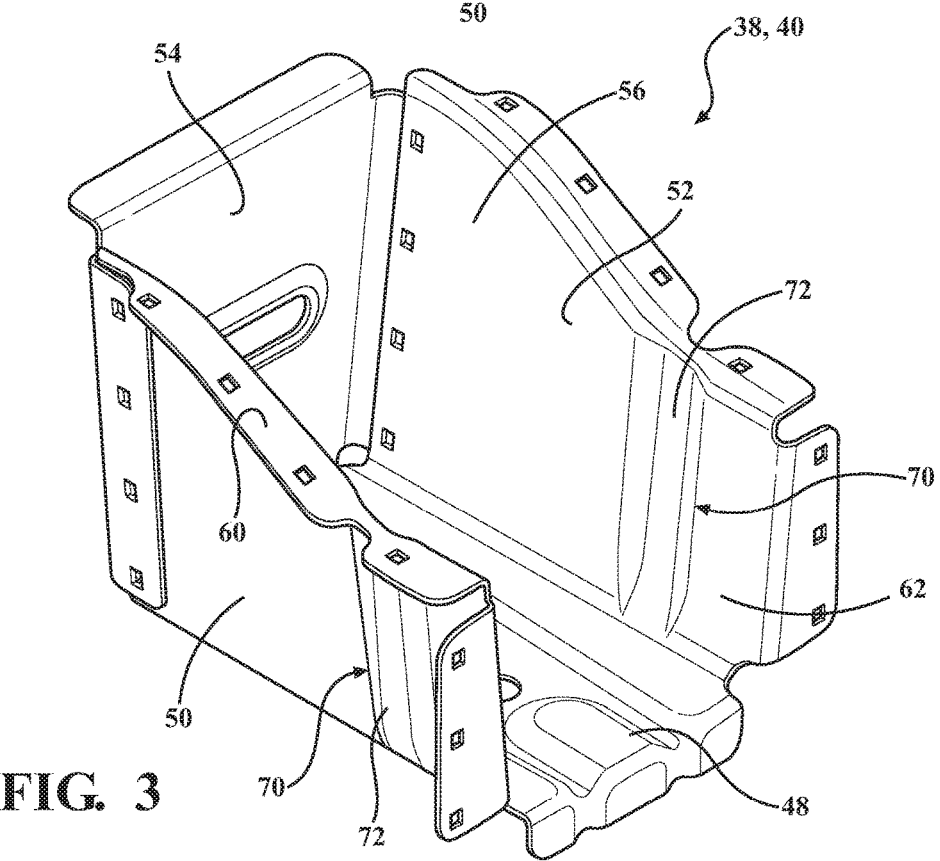
FIG. 3 is a schematic perspective view of a side load transfer device.

Referring to FIG. 3, the exemplary embodiment shown in the Figures and described herein includes the first side load transfer device 38 having a bottom wall 48, a first side wall 50, a second side wall 52, and an inboard end wall 54. In the exemplary embodiment shown in the Figures and described herein, the first side load transfer device 38 is formed from a single piece of metal, and is stamped and bent into a final shape. As such, the end wall is attached to each of the first side wall 50 and the second side wall 52. The first side load transfer device 38 includes an open top 56, which is disposed opposite the bottom wall 48. The open top 56 is positioned against a lower surface 58 of the floor pan 32. An upper edge 60 of the first side wall 50 and the second side wall 52 are both contoured to mate with the lower surface 58 of the floor pan 32. The first side load transfer device 38 includes an outboard open end 62, which is disposed opposite the inboard end wall 54. The outboard open end 62 is positioned against an inner wall 64 of the first rocker panel 34. The inboard end wall 54 of the first side load transfer device 38 is laterally spaced from the first frame rail 28 a first separation distance 66.

It should be appreciated that the second side load transfer device 40 may be constructed in a similar manner as the first side load transfer device 38, and may generally be a mirror image of the first side load transfer device 38. As such, the inboard end wall 54 of the second side load transfer device 40 is laterally spaced from the second frame rail 30 a second separation distance 68. The first separation distance 66 and the second separation distance 68 may vary depending upon the specific configuration of the vehicle 20. However, generally, it is desirable to keep the first separation distance 66 and the second separation distance 68 as small as possible. It should be appreciated that the first side load transfer device 38 and the second side load transfer device 40 may be shaped, configured and manufactured in some other manner than as shown in the Figures and described herein.

Referring to FIG. 3, the first side load transfer device 38 includes at least one deformable structure 70. The deformable structure 70 is operable to deform and absorb energy in response to the applied load. Accordingly, the first side load transfer device 38 not only transfers the first applied load 42 to the first frame rail 28, but also absorbs some of the energy through deformation. The deformable structure 70 may be configured in any suitable manner. For example, in the exemplary embodiment shown in the Figures and described herein, at least one of the first side wall 50 and the second side wall 52 includes the deformable structure 70. As shown, the deformable structure 70 is embodied as a bead 72 formed in each of the first side wall 50 and the second side wall 52. The bead 72 is designed to control the deformation of the first side wall 50 and the second side wall 52 in response to the first applied load 42. It should be appreciated that the deformable structure 70 may be configured in some other manner than shown and described in the exemplary embodiment.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A vehicle comprising:
   a frame system defining a longitudinal axis, and including a first frame rail extending along and laterally offset from the longitudinal axis;
   a body mounted to the frame system and including a first rocker panel extending along the longitudinal axis and disposed outboard of the first frame rail; and
   a first side load transfer device positioned between the first frame rail and the first rocker panel having a first inner wall, and attached to one of the first frame rail or the body, wherein
      the first side load transfer device is operable to transfer an applied load from the first rocker panel to the first frame rail,
      the first side load transfer device includes a first side wall perpendicular to the first rocker panel, a second side wall offset from the first side wall and perpendicular to the first rocker panel, and a bottom wall connected between the first side wall and the second side wall,
      at least one of the first side wall and the second side wall includes a deformable structure oriented parallel to the first inner wall of the first rocker panel, and
      the applied load is applied to the first rocker panel in an inboard direction transverse to the longitudinal axis.

2. The vehicle set forth in claim 1, wherein the first side load transfer device is axially positioned along the longitudinal axis at an approximate driver seating location.

3. The vehicle set forth in claim 1, wherein the first side load transfer device is attached to the body.

4. The vehicle set forth in claim 3, wherein the first side load transfer device is attached to the first rocker panel.

5. The vehicle set forth in claim 3, wherein the body includes a floor pan generally disposed above the first frame rail and the first rocker panel, with the first side load transfer device attached to the floor pan of the body.

6. The vehicle set forth in claim 1, wherein the first side load transfer device includes at least one deformable structure operable to deform and absorb energy in response to the applied load.

7. The vehicle set forth in claim 1, wherein the first side load transfer device further includes an inboard end wall connected between the bottom wall, the first side wall and the second side wall.

8. The vehicle set forth in claim 1, wherein the deformable structure includes a bead formed in at least one of the first side wall or the second side wall, and is oriented transverse to the longitudinal axis.

9. The vehicle set forth in claim 8, wherein the deformable structure is operable to deform and absorb energy in response to the applied load.

10. The vehicle set forth in claim 7, wherein the inboard end wall is attached between the first side wall and the second side wall.

11. The vehicle set forth in claim 7, wherein the body includes a floor pan generally disposed above the first frame rail and the first rocker panel, and wherein the first side wall and the second side wall are contoured to mate with a lower surface of the floor pan.

12. The vehicle set forth in claim 11, wherein the floor pan includes a cross bar extending transverse to the longitudinal axis, and wherein the first side load transfer device is disposed under the cross bar.

13. The vehicle set forth in claim 11, wherein the first side load transfer device includes an open top disposed opposite the bottom wall, with the open top positioned against the lower surface of the floor pan.

14. The vehicle set forth in claim 7, wherein the first side load transfer device includes an outboard open end disposed opposite the inboard end wall, with the outboard open end positioned against an inner wall of the first rocker panel.

15. The vehicle set forth in claim 1, wherein:
   the frame system includes a second frame rail extending along the longitudinal axis and laterally spaced from the first frame rail across the longitudinal axis;
   the body includes a second rocker panel extending along the longitudinal axis, having a second inner wall, and disposed outboard of the second frame rail;
   wherein the vehicle further comprises a second side load transfer device positioned between the second frame rail and the second rocker panel, and attached to one of the second frame rail or the body, wherein the second side load transfer device is operable to transfer a second applied load from the second rocker panel to the second frame rail, the second side load transfer device includes another first side wall perpendicular to the second rocker panel, another second side wall offset from the other first side wall and perpendicular to the second rocker panel and another bottom wall connected between the other first side wall and the other second side wall, at least one of the other first side wall and the other second side wall includes a deformable structure oriented parallel to the second inner wall of the second rocker panel, and wherein the second applied load is applied to the second rocker panel in a second inboard direction transverse to the longitudinal axis.

16. The vehicle set forth in claim 1, wherein the first side load transfer device is not directly attached to the frame system.

17. A vehicle comprising:

a frame system defining a longitudinal axis, and including a first frame rail and a second frame rail, each extending along and laterally offset from the longitudinal axis on opposite sides of the longitudinal axis;

a body mounted to the frame system and including a first rocker panel extending along the longitudinal axis, having a first inner wall, and disposed outboard of the first frame rail and a second rocker panel extending along the longitudinal axis, having a second inner wall, and disposed outboard of the second frame rail;

wherein the body includes a floor pan generally positioned over the first frame rail and the second frame rail, and attached to the first rocker panel and the second rocker panel;

a first side load transfer device positioned between the first frame rail and the first rocker panel, and attached to the floor pan and the first rocker panel, wherein the first side load transfer device is operable to transfer a first applied load from the first rocker panel to the first frame rail, the first side load transfer device includes a first side wall perpendicular to the first rocker panel, a second side wall offset from the first side wall and perpendicular to the first rocker panel, and a bottom wall connected between the first side wall and the second side wall, at least one of the first side wall and the second side wall includes a deformable structure oriented parallel to the first inner wall of the first rocker panel, and the first applied load is applied to the first rocker panel in an inboard direction transverse to the longitudinal axis;

a second side load transfer device positioned between the second frame rail and the second rocker panel, and attached to the floor pan and the second rocker panel, wherein the second side load transfer device is operable to transfer a second applied load from the second rocker panel to the second frame rail, the second side load transfer device includes another first side wall perpendicular to the second rocker panel, another second side wall offset from the other first side wall and perpendicular to the second rocker panel, and another bottom wall connected between the other first side wall and the other second side wall, at least one of the other first side wall and the other second side wall includes another deformable structure oriented parallel to the second inner wall of the second rocker panel, and the second applied load is applied to the second rocker panel a second inboard direction transverse to the longitudinal axis; and wherein the first side load transfer device and the second side load transfer device are each axially positioned along the longitudinal axis at an approximate driver seating location.

18. The vehicle set forth in claim 17, wherein the deformable structure and the other deformable structure are operable to deform and absorb energy in response to the first applied load and the second applied load respectively.

19. The vehicle set forth in claim 17, wherein each of the first side load transfer device and the second side load transfer device further includes an inboard end wall connected between the bottom wall, the first side wall and the second side wall respectively, an open top positioned against a lower surface of the floor pan; and an outboard open end disposed opposite the inboard end wall, with the outboard open end positioned against an inner wall of the first rocker panel and the second rocker panel respectively.

20. The vehicle set forth in claim 19, wherein the inboard end wall of the first side load transfer device is laterally spaced from the first frame rail a first separation distance, and wherein the inboard end wall of the second side load transfer device is laterally spaced from the second frame rail a second separation distance.

* * * * *